United States Patent
Kaede (10) Patent No.: US 11,776,181 B2
(45) Date of Patent: Oct. 3, 2023

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Ikumi Kaede, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 282 days.

(21) Appl. No.: 16/830,872

(22) Filed: Mar. 26, 2020

(65) Prior Publication Data

US 2020/0312000 A1 Oct. 1, 2020

(30) Foreign Application Priority Data

Apr. 1, 2019 (JP) .................. 2019-069933

(51) Int. Cl.
G06F 17/00 (2019.01)
G06T 11/60 (2006.01)
G06F 16/955 (2019.01)
G06F 40/134 (2020.01)

(52) U.S. Cl.
CPC .......... *G06T 11/60* (2013.01); *G06F 16/9558* (2019.01); *G06F 40/134* (2020.01); *G06T 2200/24* (2013.01)

(58) Field of Classification Search
CPC . G06T 11/60; G06T 2200/24; G06F 16/9558; G06F 16/958; G06F 40/134
See application file for complete search history.

(56) References Cited

U.S. PATENT DOCUMENTS

| 7,240,077 | B1 * | 7/2007 | Edelman | G06F 16/958 |
| | | | | 707/999.203 |
| 7,539,740 | B2 | 5/2009 | Hasunuma | |
| 8,095,864 | B2 * | 1/2012 | Kondo | G06F 16/955 |
| | | | | 715/205 |
| 8,427,671 | B2 * | 4/2013 | Sato | H04N 1/32122 |
| | | | | 358/1.9 |
| 9,075,777 | B1 * | 7/2015 | Pope | G06F 16/9566 |
| 10,430,474 | B2 * | 10/2019 | Denninghoff | G06F 16/954 |
| 2004/0225730 | A1 * | 11/2004 | Brown | G06F 16/972 |
| | | | | 709/224 |

(Continued)

FOREIGN PATENT DOCUMENTS

| JP | 2003-280974 A | 10/2003 |
| JP | 2006-260343 A | 9/2006 |

(Continued)

OTHER PUBLICATIONS

Jan. 10, 2023 Office Action issued in Japanese Patent Application No. 2019-069933.

(Continued)

*Primary Examiner* — Laurie A Ries
(74) *Attorney, Agent, or Firm* — Oliff PLC (57) ABSTRACT

An information processing apparatus includes a processor configured to: set a link to second display information in a portion of first display information; and edit the first display information in response to at least one of (i) access to the second display information from the set link being restricted, and (ii) a change to the second display information.

21 Claims, 9 Drawing Sheets

(56) References Cited

U.S. PATENT DOCUMENTS

| | | | |
|---|---|---|---|
| 2005/0246651 A1* | 11/2005 | Krzanowski | H04L 67/02 715/822 |
| 2006/0212792 A1* | 9/2006 | White | G06F 16/958 715/255 |
| 2006/0253771 A1* | 11/2006 | Baschy | G06F 40/103 715/234 |
| 2007/0016848 A1* | 1/2007 | Rosenoff | G06F 16/94 715/205 |
| 2007/0094611 A1* | 4/2007 | Sasaki | G06F 16/68 |
| 2007/0288589 A1* | 12/2007 | Chen | G06F 16/9574 709/219 |
| 2009/0172154 A1* | 7/2009 | Aviles Sanchez | G06F 16/9566 709/224 |
| 2010/0241951 A1* | 9/2010 | Vandervort | G06F 16/95 715/239 |
| 2010/0278453 A1* | 11/2010 | King | G06F 40/197 715/230 |
| 2011/0225142 A1* | 9/2011 | McDonald | G06F 21/552 707/E17.108 |
| 2014/0325327 A1* | 10/2014 | Belvin | G06F 16/9566 715/208 |
| 2015/0193389 A1* | 7/2015 | Rose | G06F 16/9558 715/208 |
| 2016/0292207 A1* | 10/2016 | Watanabe | G06F 40/197 |
| 2016/0308937 A1* | 10/2016 | Takei | H04L 67/02 |
| 2018/0205780 A1* | 7/2018 | Bettesworth | G06F 40/197 |
| 2018/0239498 A1* | 8/2018 | Young | G06F 3/0484 |
| 2019/0197077 A1* | 6/2019 | Li | H04L 41/16 |

FOREIGN PATENT DOCUMENTS

| | | |
|---|---|---|
| JP | 2009-169788 A | 7/2009 |
| JP | 2010-518533 A | 5/2010 |
| JP | 2010-257203 A | 11/2010 |
| JP | 2012-123598 A | 6/2012 |

OTHER PUBLICATIONS

Jun. 27, 2023 Office Action issued in Japanese Patent Application No. 2019-069933.

* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-069933 filed Apr. 1, 2019.

BACKGROUND

(i) Technical Field

The present disclosure relates to information processing apparatuses and non-transitory computer readable media.

(ii) Related Art

When a content creator creates certain content (e.g., content A), the content creator may sometimes cite or link another content (e.g., content B). A viewer of the content A may select a link to the content B within the content A so as to refer to the details of the content B. However, the content B does not necessarily continue to exist in the same state as that when the content A is created. For example, in addition to changes made to the details of the content B, the content B may be released for a limited time period or may be changed to members-only content. For example, see Japanese Unexamined Patent Application Publication Nos. 2003-280974, 2009-169788, and 2010-257203.

SUMMARY

Aspects of non-limiting embodiments of the present disclosure relate to a case where it is difficult to display the details of second display information when a link to the second display information is set via the link set in first display information.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: set a link to second display information in a portion of first display information; and edit the first display information in response to at least one of (i) access to the second display information from the set link being restricted, and (ii) a change to the second display information.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described below with reference to the drawings.

Figure 1:
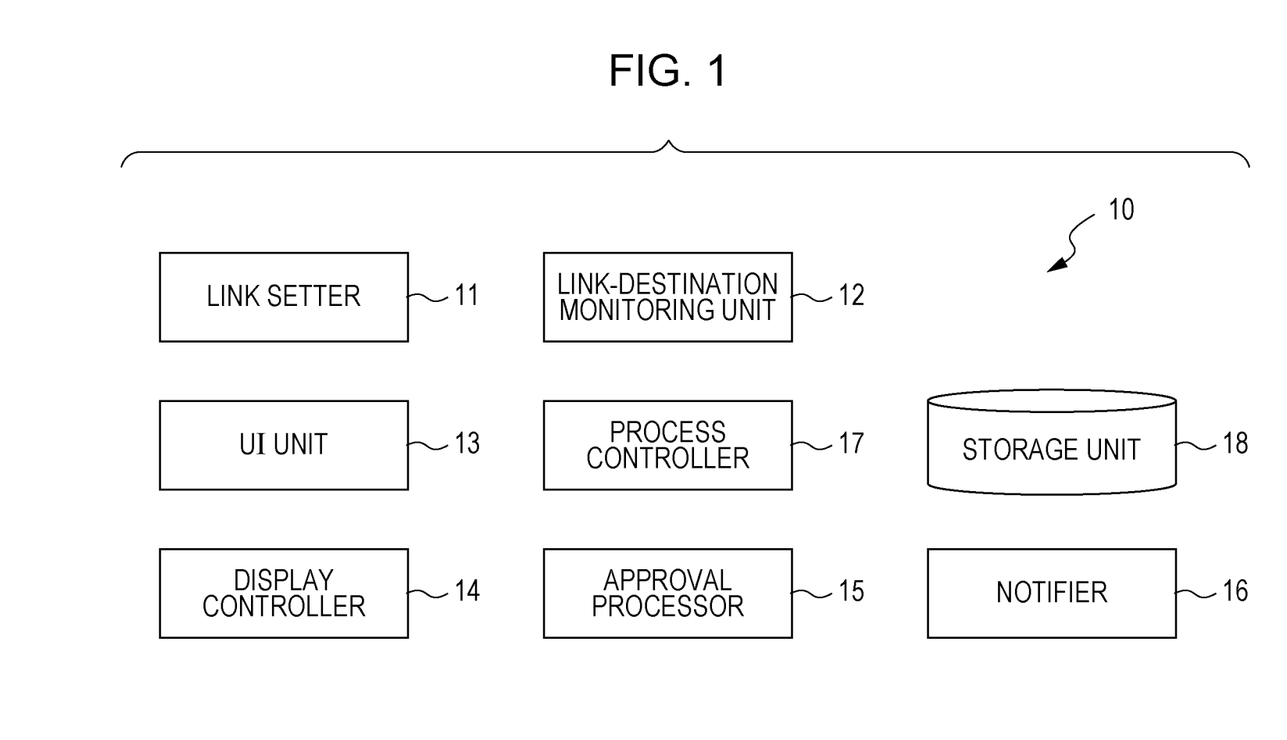
FIG. 1 is a block diagram illustrating an information processing apparatus according to an exemplary embodiment of the present disclosure.

FIG. 1 is a block diagram illustrating an information processing apparatus according to an exemplary embodiment of the present disclosure. An information processing apparatus 10 according to this exemplary embodiment includes a content-displayable web browser and an application. Examples of the content include a web page, documents of various formats, such as a Word format, an Excel format, and a portable document format (PDF), an image, a video, and audio. Information serving as a source of the content to be displayed will be referred to as "display information". The term "display" in the "display information" refers to an indication of information in the form of a table, and is not limited to an indication of the information in a visible manner, but also includes an indication of the information to a user by a sensory method other than a visual method, such as a method of using audio mentioned above. If the content is a web page, typical display information is page data described in the hypertext markup language (HTML). Additionally, the display information includes document data for displaying a document, image data for displaying an image, video data for displaying a video, and audio data for reproducing audio.

The browser or the application displays the content on a screen based on the display information. The page data described in HTML is read by the browser and is displayed on the web page. Sometimes, a link is set in the display information of the content. For example, a hyperlink is set in a part of text of the page data, and a text string with the set hyperlink (sometimes simply referred to as "link" hereinafter) may be displayed in a color different from that of text strings not having links or may be displayed with an underline, so that it is apparent that the hyperlink is set. In many cases, when a viewer sets a cursor on a part having a link, visual feedback is performed, including displaying of the http address of the web page of the link destination on a pop-up screen or changing of the appearance of the cursor. A link does not necessarily have to be set in a text string, and may alternatively be set in, for example, a snippet, an image, or a video. Moreover, a link does not have to be visually recognizable. One example is audio. A link destination may be opened not only by operating link-related information on a screen but by, for example, performing an operation using audio or gesture. This includes an example where the link destination opens in relation to reproduction of first display information.

If a hyperlink set in first display information (e.g., page data A) is a link to second display information (e.g., page data B), when a viewer selects the link (set in a text string, for example) to the page data B having content (e.g., web page A) corresponding to the page data A, content (e.g., web page B) corresponding to the page data B is displayed.

Accordingly, the first display information is display information about the link source of a single link. The second display information is display information about the link destination of the single link. The first display information and the second display information may be of the same type or may be of different types. Moreover, the types may be freely combined. For example, the first display information and the second display information may both be web page data or may both be video data. Furthermore, there may be a case where the first display information is video data and the second display information is web page data, or a case where the first display information is web page data and the second display information is PDF document data.

Figure 2:
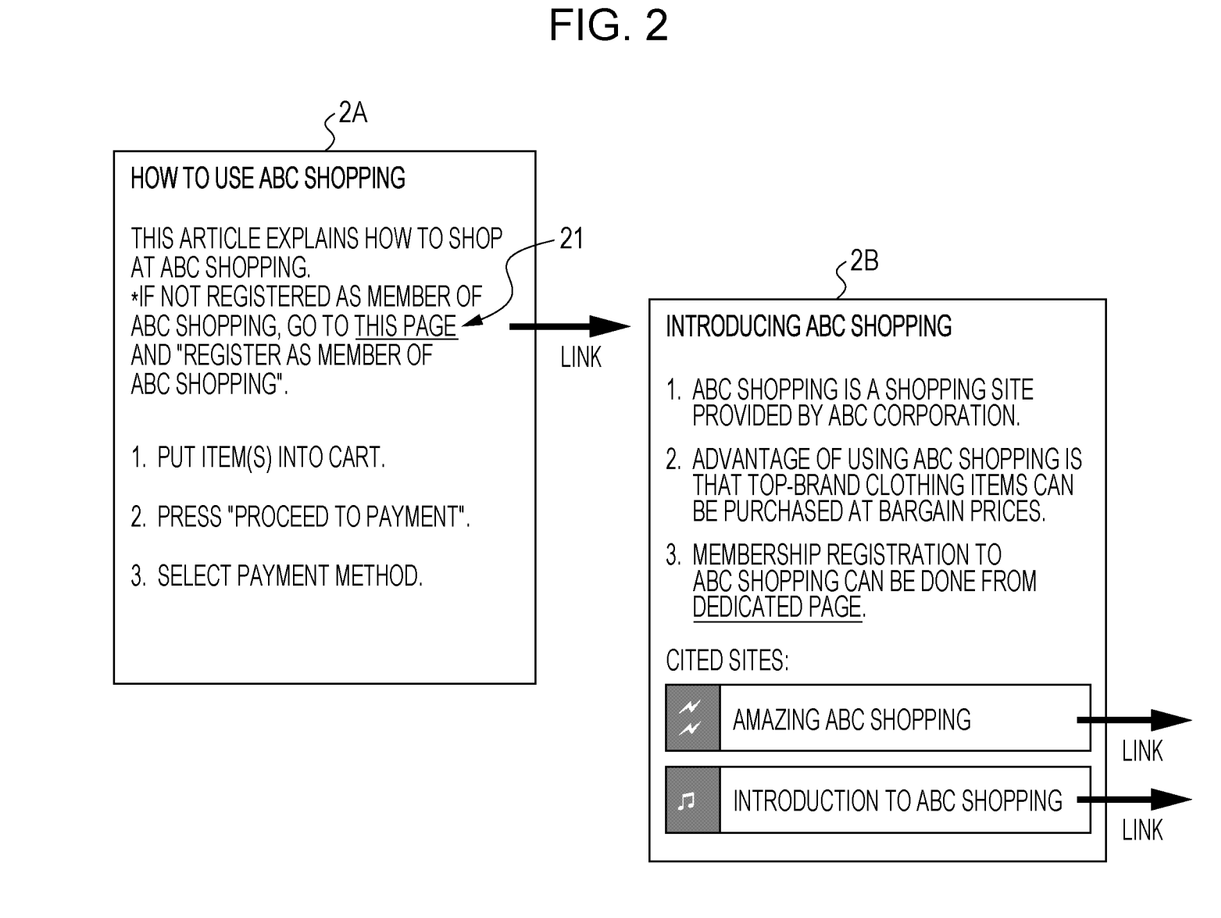
FIG. 2 illustrates display examples of first display information in which a link is set and second display information serving a link destination, in accordance with this exemplary embodiment.

In the following exemplary embodiment, HTML data corresponding to page 2A shown in FIG. 2 is described as being the first display information and HTML data corresponding to page 2B is described as being the second display information. Moreover, the content displayed based on the first display information may sometimes be referred to as "source content", and the content displayed based on the second display information may sometimes be referred to as "target content".

The information processing apparatus 10 according to this exemplary embodiment may be realized by an existing versatile hardware configuration, such as a personal computer (PC). Specifically, the information processing apparatus 10 is constituted by connecting an input-output controller, which connects a central processing unit (CPU), a read-only memory (ROM), a random access memory (RAM), a hard disk drive (HDD), a mouse and a keyboard provided as an input unit, and a display provided as a display unit, and a network interface provided as a communication unit to an internal bus.

As shown in FIG. 1, the information processing apparatus 10 has a link setter 11, a link-destination monitoring unit 12, a user interface (UI) unit 13, a display controller 14, an approval processor 15, a notifier 16, a processing controller 17, and a storage unit 18. Components not used for explaining this exemplary embodiment are not shown in FIG. 1.

The link setter 11 sets a link function to the second display information in a specific section of the first display information. The link-destination monitoring unit 12 monitors the second display information and detects a change in the second display information. The monitoring may be performed at all times or may be performed at a specific timing (e.g., once every five minutes, once per month, when a link is clicked, or when a link is clicked for the first time within a certain period). In detail, the link-destination monitoring unit 12 may store the second display information corresponding to a certain time point in the past and may detect a change by comparing the stored second display information with the latest second display information, or may detect a change by operating in cooperation with a system that receives a notification if there is a change in the second display information. Alternatively, the link-destination monitoring unit 12 may perform both methods.

Examples of a specific change include the following: deletion of the entire second display information (including deletion of the uniform source locator (URL); and changing of the second display information (including addition of new text, image, video, or audio to the second display information and partial deletion of text, image, video, or audio from the second display information).

The UI unit 13 receives an input from a user using the information processing apparatus 10 or presents information. Alternatively, the user interface unit 13 may receive an input from the user or present the information via a network. The display controller 14 performs display control on a display or a terminal device connected via a network, such as a terminal device used by a content creator or a manager. The approval processor 15 executes an approval process involving, for example, receiving an approval for changing the first display information from the content creator. The notifier 16 notifies a manager of the second display information that the second display information is no longer used after a process for changing the first display information is executed. The processing controller 17 operates in cooperation with the above-described components 11 to 16 of the information processing apparatus 10 to perform processing control, such as the process for changing the first display information. The storage unit 18 stores change conditions to be used in the process for changing the first display information and also stores information related to the changing of the first display information, such as the details of the process corresponding to the conditions.

The components 11 to 17 in the information processing apparatus 10 are realized in accordance with cooperative operation between the computer constituting the information processing apparatus 10 and a program executed by the CPU included in the computer. Furthermore, the storage unit 18 is realized by the HDD included in the information processing apparatus 10. Alternatively, the RAM or an external storage unit may be used via a network.

Furthermore, the program used in this exemplary embodiment may be provided via a communication unit or may be provided by being stored in a computer-readable storage medium, such as a compact disc read-only memory (CD-ROM) or a universal serial bus (USB) memory. The program provided via the communication unit or the storage medium is installed in the computer, and the CPU of the computer sequentially executes the program, whereby various types of processes are realized.

Next, the operation according to this exemplary embodiment will be described. First, a process for setting a link in content will be described with reference to a flowchart shown in FIG. 3.

Figure 3:
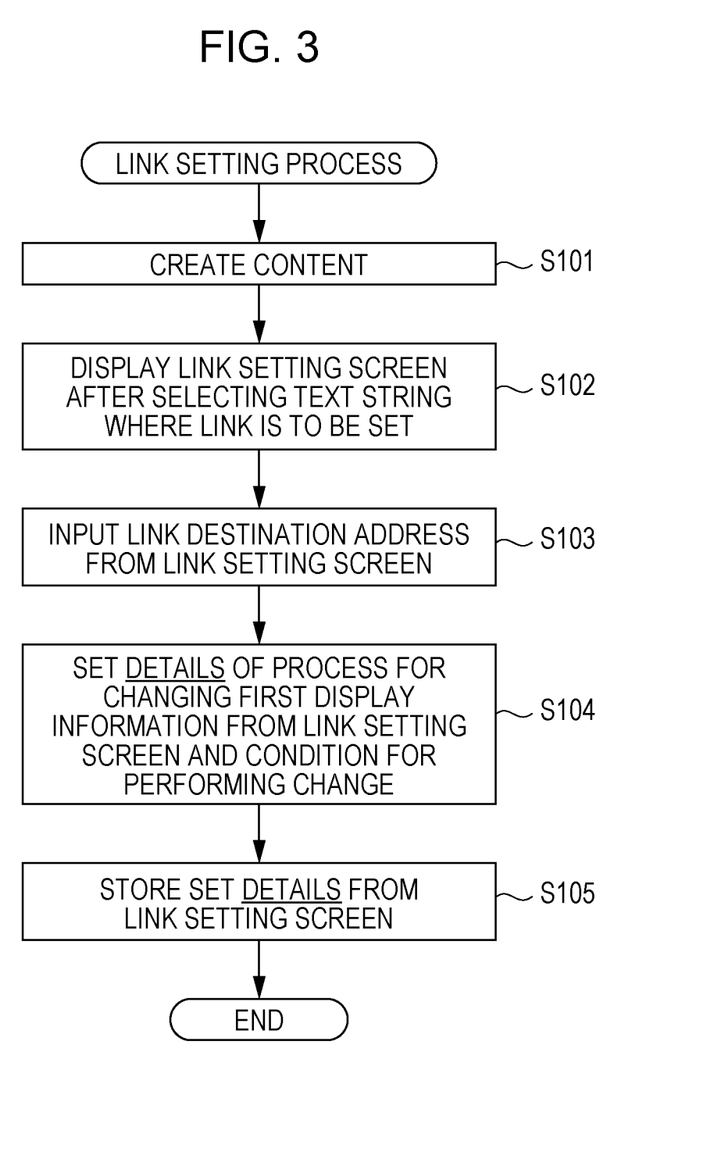
FIG. 3 is a flowchart illustrating a process for setting a link in content in accordance with this exemplary embodiment.

First, in step S101, a content creator creates content by using an existing technique. Then, if a hyperlink is to be set in a part of the created content, the following process is performed in this exemplary embodiment. The content creator may perform the link setting process by using the information processing apparatus 10. Alternatively, in this exemplary embodiment, it is assumed that the link setting process is performed from a terminal device connected to the information processing apparatus 10 via a network.

Figure 4:
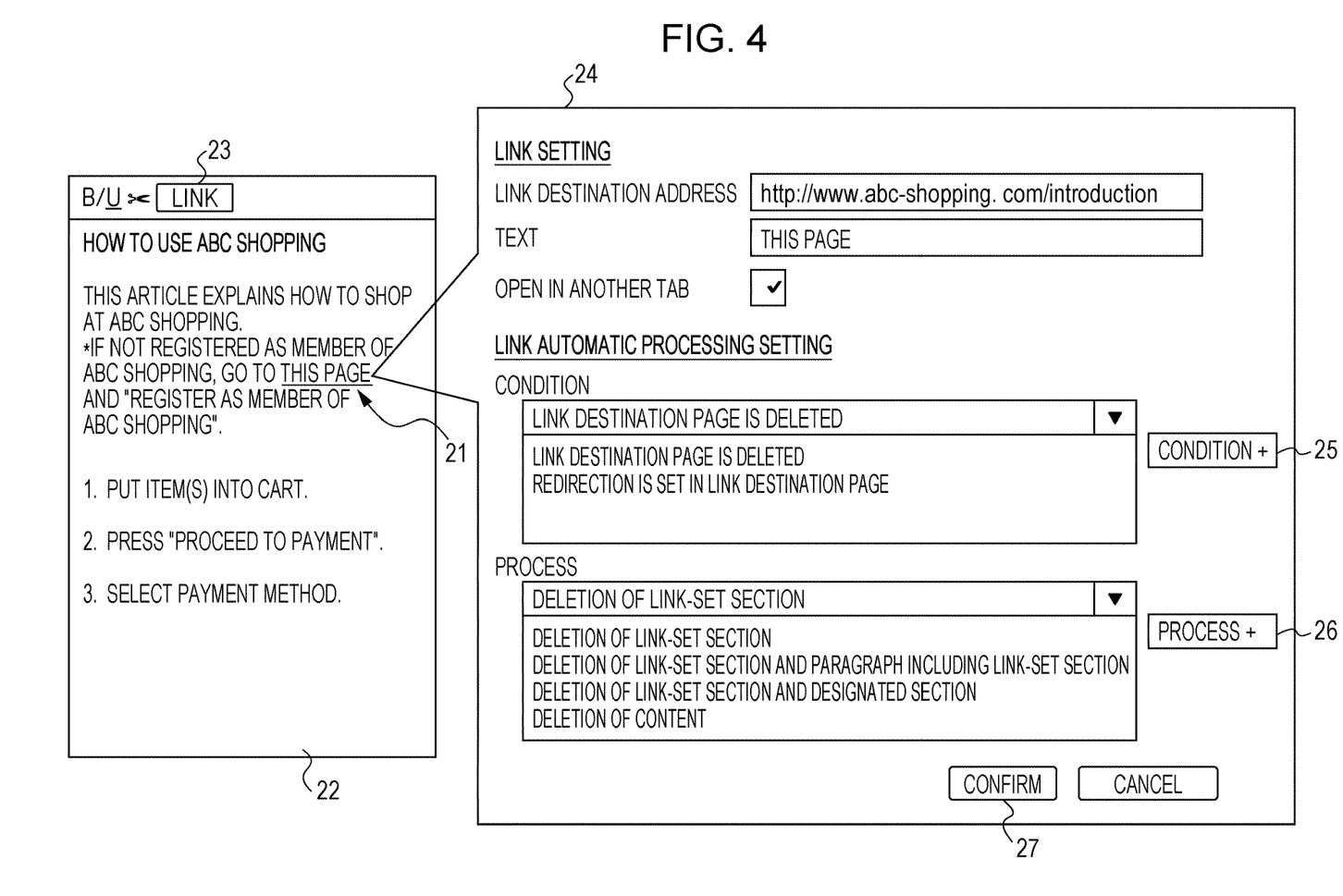
FIG. 4 illustrates an example of a screen displayed when link-related information is set in the first display information in accordance with this exemplary embodiment.

FIG. 4 illustrates an example of a screen displayed when link-related information is to be set in the first display information. In detail, the screen is an example of an editor screen used for editing page data. An editing person may add or delete text, an image, and/or a video to or from page data via this editor screen, or may set a link in a specific text string or a specific image. An editor may be an editor (often called a visual editor) that performs editing in a state similar to the appearance of a web page or an editor (often called a text editor) that performs editing in an HTML state. The link setting process may be performed using either one of the editors. FIG. 4 is an example of a visual editor.

As shown in FIG. 4, the content creator sets a link and link-related information in viewed content on the editor screen. In detail, the content creator selects a text string 21 (i.e., "this page" in the example shown in FIG. 4) in which a link is to be set, and then clicks a link setting button 23 disposed at the upper section of the display screen of first display information 22. In response to this selection made by the content creator, the link setter 11 displays a link setting screen 24 in step S102. Selection items to be displayed as conditions and processes on the link setting screen 24 are stored in advance in the storage unit 18.

Specifically, the operation in the information processing apparatus 10 when the link setting screen 24 is to be displayed is as follows. When the user interface unit 13 receives an operation performed by the content creator via a network, the processing controller 17 recognizes that the received operation is an operation for selecting the link setting button 23 and commands the link setter 11 to execute the link setting process in accordance with this recognition. The link setter 11 commands the display controller 14 to display the link setting screen 24 in accordance with the command from the processing controller 17. The display controller 14 causes the user interface unit 13 to display, on the content creator's terminal device, the link setting screen 24 together with the first display information 22 in accordance with the command from the link setter 11. In other words, the user interface unit 13 transmits information used for screen display via the network. In the following description, a simple expression is used for the sake of convenience, as in "the link setter 11 displays the link setting screen 24". The same applies to other display-related processes to be described later.

Next, the details to be set by the content creator via the link setting screen 24 will be described.

In step S103, the content creator inputs a "link destination address" corresponding to the text string 21 via the displayed link setting screen 24. In a "text" field, the text string 21, in which a link is to be set, in the first display information is input. Since the content creator has designated the text string 21, in which a link is to be set, on the first page, the link setter 11 may extract the text string 21 and automatically set the text string 21 in the "text" field. When the content creator inputs a checkmark to a checkbox for "open in another tab", the link destination page is displayed in a tab different from the tab displaying the first display information 22.

Subsequently, in a link automatic processing setting region on the link setting screen 24, a process to be executed when a change in the second display information is detected is set. Specifically, in step S104, "condition" and "process" are set in correspondence with each other. In the "process" field, a process for changing the first display information is set by being selected by the content creator. The "condition" field indicates conditions for executing relevant processes and specifically includes the details of a change in the second display information or target content detected by the link-destination monitoring unit 12.

FIG. 4 illustrates an example where two conditions, namely, "link destination page is deleted" and "redirection is set in link destination page", are displayed as selectable conditions. Alternatively, conditions other than those exemplified may be set as the conditions. When a change corresponding to either of these two conditions occurs, the link destination page (i.e., the target content) is no longer displayed with the same details as before, that is, the same details as the display details of the link destination page at the point when the first display information is created. A case where the "link destination page is deleted" corresponds to a case where the link destination page, that is, the target content, has been deleted. A case where a "designated period has elapsed" corresponds to a case where a designated contract-based expiration date (e.g., a validity date) is reached. A case where "redirection is set in link destination page" corresponds to a case where the link destination address has been changed.

Moreover, FIG. 4 illustrates an example where four processes, namely, "deletion of link-set section", "deletion of link-set section and paragraph including link-set section", "deletion of link-set section and designated section", and "deletion of content", are displayed as selectable processes. Alternatively, processes other than those exemplified may be set as the processes. The "deletion of link-set section" involves a process performed by an editing person (e.g., the aforementioned content creator) for deleting only a link-set section (i.e., the text string 21 shown in FIG. 4). The "deletion of link-set section and paragraph including link-set section" involves a process performed by an editing person for deleting both a link-set section and a non-link-set section included in a paragraph where the link-set section is located if the text contained in the first display information is separated into paragraphs. If the first display information is separated into multiple regions, such as paragraphs, in this manner, the deletion is performed in units of regions by deleting both the link-set section and the non-link-set section included in the region where the link-set section is located. The "deletion of link-set section and designated section", which will be described in detail later with reference to an example, involves a process performed by an editing person for deleting both a link-set section and a section designated by a user from a non-link-set section. The "deletion of content" involves a process performing by an editing person for deleting the first display information so as not to allow a viewer to access the first display information. The viewer may be a person different from or the same as the editing person performing the above-described deletion.

In this exemplary embodiment, a condition for executing a process for changing the first display information and the changing process are set as a group via the link setting screen shown in FIG. 4. A condition to be linked with a process is not necessarily limited to a single condition. By selecting a condition button 25, multiple conditions may be set with respect to a single process. Furthermore, by selecting a process button 26, multiple processes may be set with respect to a single condition.

Moreover, a group of multiple conditions and processes may be set with respect to a single link. For example, in a case where m (m≥2) condition items are provided as conditions and n (n≥2) process items are provided as processes, one or more items are selected individually from the m condition items and the n process items. In a case where multiple items are to be selected, priority levels may be set for the respective items in accordance with the arranged order of the selected items or by allowing the priority levels to be designatable.

Furthermore, a condition-dependent branching method is also permissible, such as executing a process A when a certain condition C is met and executing a process B when the condition C is not met. Alternatively, a setting process for complicated conditions involving a value setting process is also permissible, such as changing the link destination to content replacing the second display information if the number of visitors to the source content as a detection value is larger than or equal to a predetermined threshold value or deleting the link to the second display information if the number of visitors is below the threshold value.

When the content creator selects a confirm button 27 after setting the condition and the process linked with the condition, the link setter 11 links information related to the set condition and the set process (referred to as "link setting information" hereinafter) with the first display information and stores the link setting information in the storage unit 18 in step S105.

The link-destination monitoring unit 12 monitors the second display information. If a change occurs in the second display information, the processing controller 17 updates the first display information by executing a process according to the details of the change (i.e., a matching condition among the conditions set in the link setting information) in accordance with the set details of the link setting information, whereby the display details of the source content are also updated accordingly.

Normally, a "change" occurring in the second display information (or the target content) is deletion of the entire second display information or a change in the details (e.g., addition, partial deletion, or both addition and partial deletion) of the second display information. However, with regard to a change in the descriptive details of the second display information, for example, a revision for a typographical error or omission is not a substantial change. Therefore, if a change in the descriptive details of the second display information is a change in the number of characters by a predetermined number or smaller or if the percentage of change calculated from the amount of change (e.g., the number of characters) relative to the entire descriptive amount is smaller than or equal to a predetermined value, the link-destination monitoring unit 12 or the processing controller 17 does not regard such a change as a "change" in this exemplary embodiment.

A change in a section other than a "principal section" in the second display information (or the target content) is not regarded as a "change" in this exemplary embodiment. The term "principal section" refers to a principal section of information provided by the second display information and corresponds to, for example, an "article section" on a typical web page or a "video playback area" on a video website. Information displayed in a field that dynamically displays an element fixed across multiple pages in a website, such as a header, a footer, a sidebar, a submenu, a breadcrumb list, a comment entry field, or a search box, a comment display field, a personalized advertisement field, a related article, or a related video does not correspond to a principal section.

Furthermore, a change may be detected in view of the meaning of information provided by the second display information. For example, even in a case where the details of the second display information are changed, if there is no change in the details of the information to be provided, it is determined that there is no change. Alternatively, the similarities between the first display information and the second display information may be determined using a known method. Even if a change occurs in the second display information, if there is a difference by a predetermined threshold value or greater with respect to each similarity with the first display information before and after the detection of the change, it may be determined that there is no "change" in this exemplary embodiment.

The details of an appropriate process for not displaying a link destination page may sometimes change depending on a link-set section, such as text (e.g., the text string 21 in the example shown in FIG. 4), a thumbnail image, a photograph, or a video. Therefore, the content creator may change the options for processes to be displayed as selectable processes on the link setting screen 24 in accordance with the characteristics of the link-set section.

For example, if the link-set section is a sentence or a text character or characters in a paragraph, it is highly possible that simple deletion of the link-set section may result in a grammatically and semantically awkward description. This corresponds to a case where the text string 21 alone shown in FIG. 2 is deleted. In other words, there is a high possibility that the process of deleting the link-set section alone is inappropriate. Therefore, instead of presenting the "deletion of link-set section" as an option to the content creator, only an option considered to be appropriate, such as the "deletion of link-set section and paragraph including link-set section", may be presented as a candidate for a process to be executed. This does not apply to a case of a list of items even if the link-set section is a text character or characters in a paragraph.

Furthermore, as another example, if the link-set section is in a tag other than a <p> or </p> tag indicating a paragraph, only an option considered to be appropriate, such as the "deletion of link-set section", may be presented as a candidate for a selectable process instead of presenting the "deletion of link-set section and paragraph including link-set section" as an option.

In this exemplary embodiment, the setting process involves allowing the content creator to open a pop-up screen (i.e., the link setting screen 24 shown in FIG. 4) for setting a link and to input or select necessary information via the pop-up screen. Alternatively, a link may be set in accordance with another method. For example, a process necessary for setting a link may partially or entirely be automated. Specifically, as other alternative methods for setting a link, some website creating tools have a function of automatically embedding a tweet or video having a clickable link into a page by simply pasting a uniform resource locator (URL) of the tweet on Twitter (registered trademark) or the video on YouTube (registered trademark) onto an editor. Moreover, a series of processing involving extracting a product name by audio-analyzing the details spoken by a person in a video, inquiring a product database, and setting a link transmitted from the database to a part in the video where the product name is spoken may also be automated by combining existing technologies.

Figure 5:
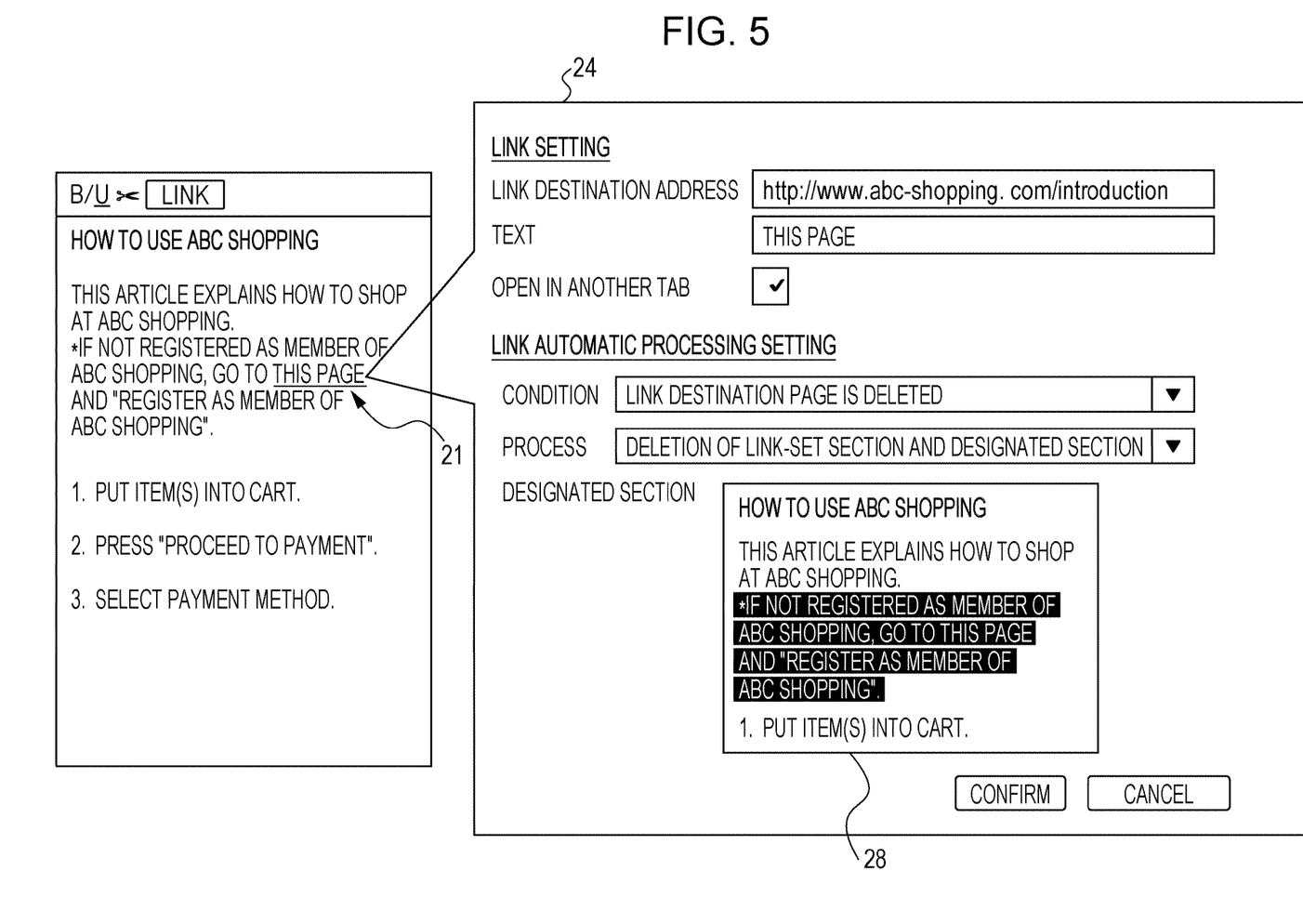
FIG. 5 illustrates a display example of a link setting screen used by a content creator for designating a designated section in accordance with this exemplary embodiment.

FIG. 5 illustrates a display example of the link setting screen 24 used by the content creator for designating a designated section when the "deletion of link-set section and designated section" is selected as a process via the link setting screen 24 shown in FIG. 4.

When the "deletion of link-set section and designated section" is selected, the link setter 11 displays a designated-section designating region 28 on the link setting screen 24 and further displays the first display information in the designated-section designating region 28. Then, the content creator is caused to designate a designated section from the designated-section designating region 28. FIG. 5 illustrates an example where a designated range, that is, the designated section, is displayed in a black-highlighted fashion. In detail, in the illustrated example, a range including a link-set text string "this page" (* If not registered as member of ABC Shopping, go to . . . of ABC Shopping) is designated as the designated section.

As an alternative to this exemplary embodiment in which the content creator is caused to designate a specific section including the link-set text string "this page", for example, the link setter 11 may analyze the first display information, automatically extract a sentence including a link-set text string as a specific section, and automatically set the extracted specific section as the designated section.

Figure 6:
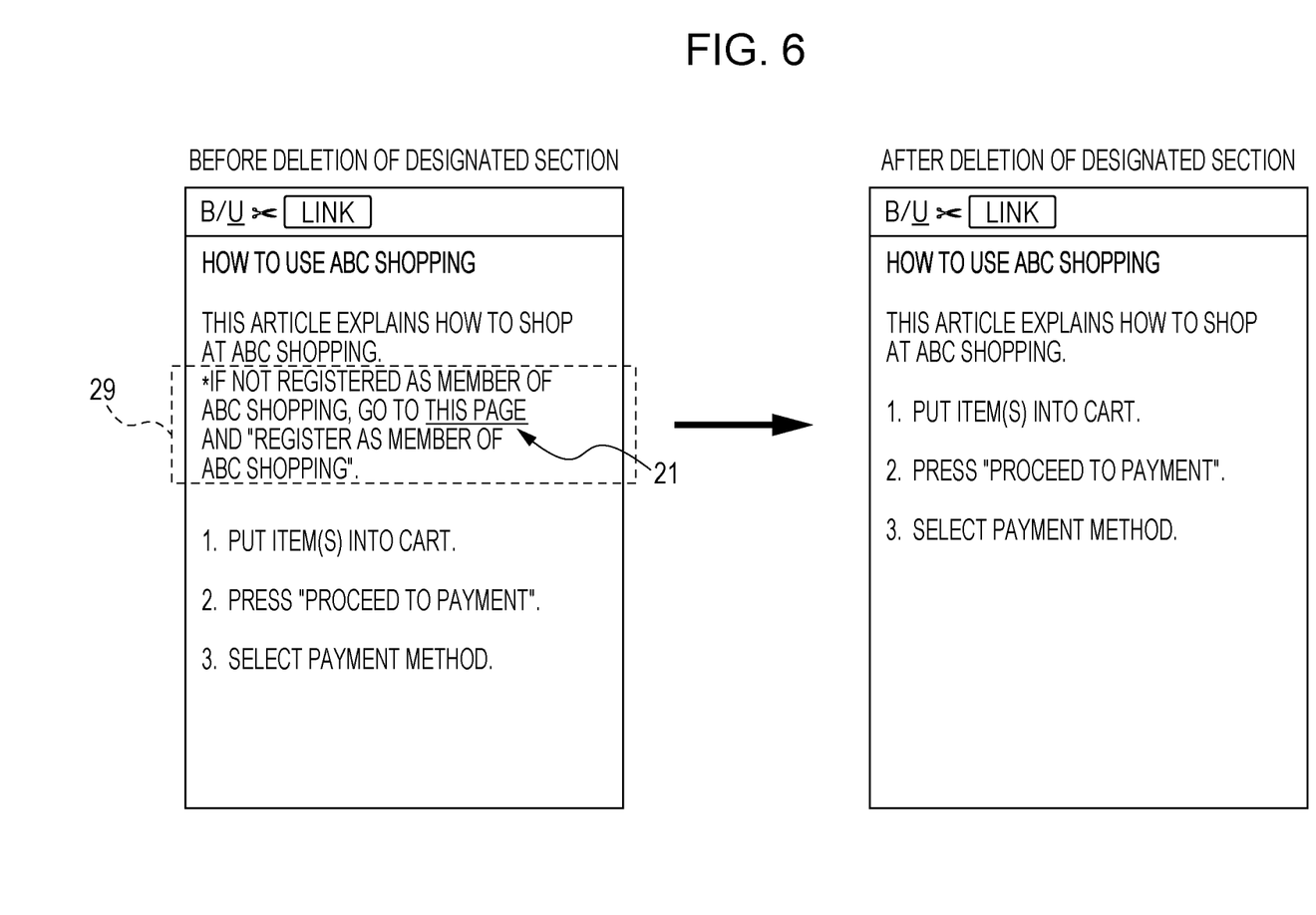
FIG. 6 illustrates a display example of the first display information before and after a process is performed thereon in accordance with this exemplary embodiment.

FIG. 6 illustrates a display example of the first display information before and after a process based on this setting is executed. As it is apparent from a comparison between display examples before and after a designated section is deleted, if a change that meets a condition corresponding to the relevant process occurs, the information is displayed in a state where a description 29 selected as the designated section in FIG. 5 has been deleted.

In a case where the first display information is to be displayed in a state where the designated section has been deleted, the processing controller 17 causes the section subsequent to the section deleted from the first display information, specifically, the section from "1. Put item(s) in cart." and onward, to be displayed in a raised fashion. Accordingly, this may avoid poor appearance of the source content caused by deletion of a specific section.

According to the above display example, the viewer of the source content may avoid a problematic state where a link destination page is not displayed when the link-set text string 21 is selected from the source content corresponding to the first display information prior to the deletion of the designated section. However, this may make it impossible to see the information originally obtainable from the link destination page. This may be dealt with as follows.

When the content creator inputs address information of the storage destination for the second display information as a link destination address to the link setting screen 24, the link setter 11 analyzes the descriptive details of the second display information and also analyzes a page on the Internet, so as to preliminarily select content (e.g., third display information) corresponding to a page that provides information having the same details as the information provided by the second display information. Then, a process for changing the link destination address from the storage destination for the second display information to the storage destination for the third display information is preliminarily registered in the storage unit 18 as a process selectable via the link setting screen 24. Then, when the process is selected, the link setter 11 generates link setting information by associating the process and a selected condition with each other.

If a change that meets the set condition currently occurs in the second display information, the processing controller 17 executes a process for switching the link destination from the second display information to the third display information. Accordingly, the information having the same details as the information provided by the second display information may be continuously presented to the user viewing the source content.

In the above description, the third display information is searched for when the content creator inputs the address information of the storage destination for the second display information to the link destination address on the link setting screen 24. Alternatively, the descriptive details of the second display information may be acquired, and the third display information may be selected when a change that meets the condition set in the second display information occurs.

As another alternative, a process for changing the first display information may be performed such that the information provided by the second display information is incorporated into the first display information.

Specifically, when the content creator inputs the address information of the storage destination for the second display information to the link destination address on the link setting screen 24, the link setter 11 acquires the descriptive details of the second display information and generates incorporation information to be incorporated into the first display information. Then, a process for incorporating the information obtained from the second display information into the first display information is preliminarily registered in the storage unit 18 as a process selectable via the link setting screen 24. When the process is selected, the link setter 11 generates link setting information by associating the process and a selected condition with each other.

If a change of an event that meets the set condition occurs in the second display information, the processing controller 17 deletes the link-set section and incorporates the incorporation information to the deleted section or to an appropriate location. Accordingly, information having the same details as the information provided by the second display information may be presented in the first display information to the user viewing the source content.

As described above, even when the link-set text string 21 is no longer displayed, the information obtained from the second display information may be presented to the user.

In the above description, the entire second display information is set as a detection destination for a change. However, in actuality, the detection destination may sometimes be limited to a part of the second display information instead of the entirety thereof. For example, with reference to the display example of the first display information shown in FIG. 2, in order to provide membership-registration-related information to a viewer (specifically, an "unregistered member"), the viewer is made to refer to the link destination page. In other words, it is conceivable that, in the information provided by the link destination page, it may be necessary to detect a change in the membership-registration-related information, whereas a change in information other than the membership-registration-related information is not much relevant. A section targeted for detection of a change in the link destination page is limitable. The section having information targeted for detection of a change may be designated by the user or may be extracted by automatically analyzing the second display information.

Figure 7:
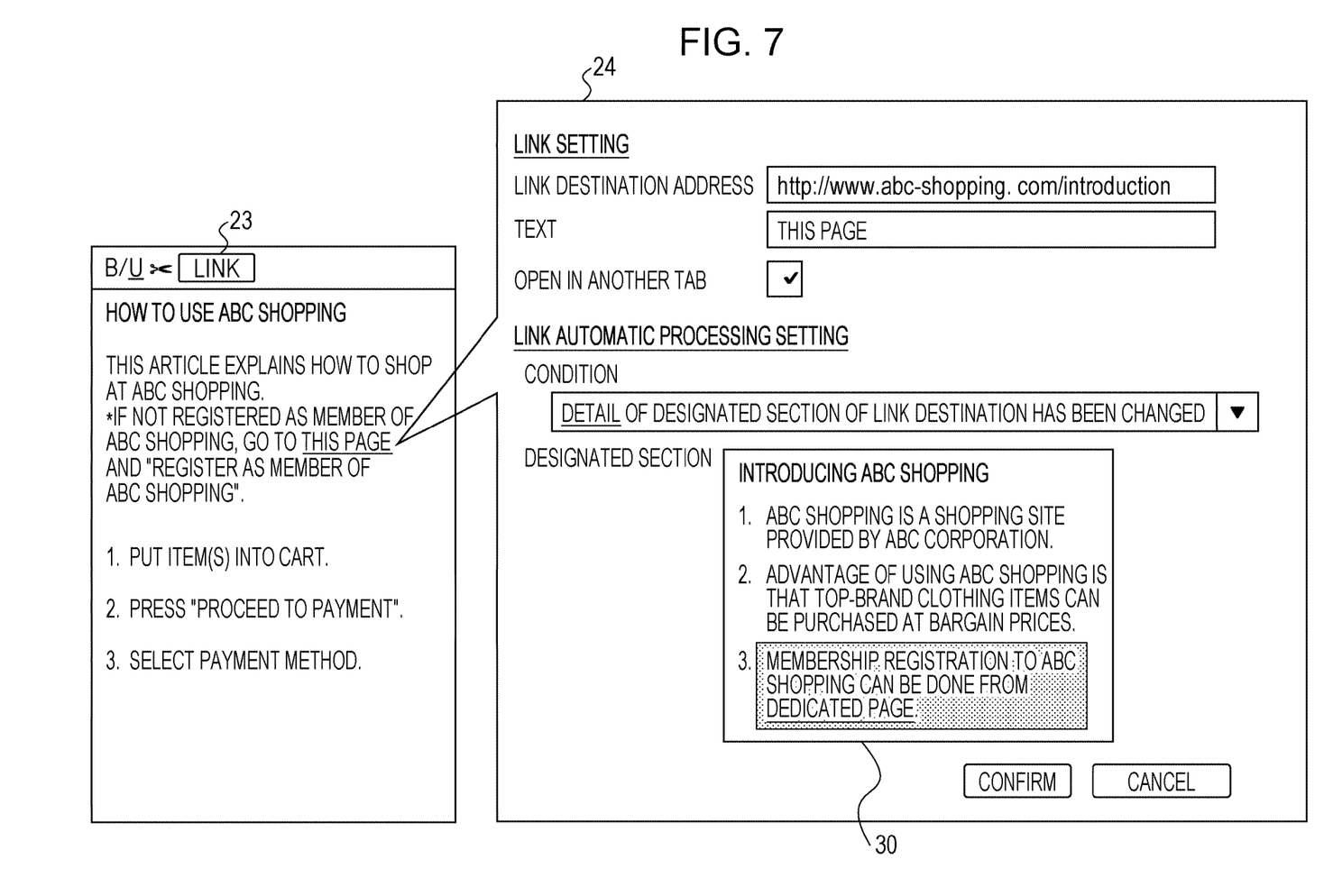
FIG. 7 illustrates a display example of a screen used for designating a range in which a change in a link destination is detected in accordance with this exemplary embodiment.

FIG. 7 illustrates a screen display example where the condition "detail of designated section of link destination has been changed" is selected as a condition by the content creator via the link setting screen 24. This corresponds to a specific example where the user is made to designate the aforementioned section targeted for detection of a change in the link destination page (i.e., the user is made to limit the aforementioned section to a link-destination designated section). When this condition is selected via the link setting screen 24, the link setter 11 displays a designated-section designating region 30 on the link setting screen 24 and further displays the link destination page in the designated-section designating region 30. Then, the content creator is made to designate a designated section from the designated-section designating region 30. In FIG. 7, a range designated by the user is shown in a dotted pattern. In detail, an example where a membership-registration-related text string "membership registration to ABC Shopping" is designated as a designated section is shown. By performing the setting process in this manner, the link-destination monitoring unit 12 monitors only a section corresponding to the second display information as a range targeted for detection of a change.

With regard to detection of a change, the description of the second display information is entirely or partially targeted for detection of a change by the link-destination monitoring unit 12. However, even when there is no change in the second display information itself, if a change occurs in information related to the second display information, this change may be included in a change in the second display information, and the display of the first display information may be controlled in correspondence with the details of the change in the information related to the second display information. This will be described below. In this case, the link-destination monitoring unit 12 also monitors the information related to the second display information as a target for detection of a change. For example, if a corporation or organization managing content on the Internet provides a service used for searching for the usage conditions and usage fee for each item of content, it is conceivable that the usage conditions and usage fee of the second display information of the link destination are monitored by connecting to the service.

As a result of the monitoring, for example, even if a link to the second display information is permitted for free when the second display information is first linked to the first display information, it is conceivable that a fee payment is necessary for linking to the second display information thereafter. It is also conceivable that an increase in fee from 10 dollars per month to 20 dollars per month is detected. Even if the second display information itself is not deleted (i.e., even if a change has not occurred), the user may desire to continuously use the second display information after the usage conditions have changed, or may desire to stop using the second display information. For example, in a case where the usage fee for the second display information becomes higher than or equal to a certain amount or in a case where there is an announcement that the usage fee may become higher than or equal to the certain amount, it is convenient to set a combination of a condition and a process for deleting the link to the second display information with respect to the link.

In a case where a permission for pasting a link to the second display information is obtained by contract, when the expiration date for the link is reached, the second display information may still be not deleted (i.e., a change has not occurred), or the access to the second display information may or may not be blocked. In this case, it is assumable that legal problems may occur as a result of the user continuously using the second display information in a state where the user is not permitted to use the second display information. Such a case is dealt with by, for example, executing the process for deleting the link to the second display information from the first display information.

Furthermore, even if the expiration date has not been reached yet, it is ascertainable in advance that the expiration date is approaching. When a change in information related to the second display information is predictable in this manner, since it is predictable that the expiration date is approaching in accordance with this example, for example, the process for deleting the link to the second display information may be executed before the expiration date is reached. In a case where the contract is fee-based, it is effective that measures may be taken in advance, as described here.

Alternatively, the release range of the second display information may be treated as information attached to the second display information. For example, some news sites allow anyone to view an article for free for one week from the release of the article, but allow only fee-paying members to view the article after one week. There is another case where a manager in a corporation intends to suddenly limit the right of access to certain document data corresponding to the second display information (e.g., as in a case where the viewing authorization changes from "everyone" to "manager only"). If there is such a change in the second display information, it is conceivable that a setting process be desirably performed for deleting the link. Alternatively, a process for incorporating a warning message indicating "viewing authorization: manager only" to the first display information may be performed. Accordingly, it is comprehensible within the link source page before clicking on a link that clicking on the link does not necessarily imply that everyone is capable of accessing information of the link destination.

As described above, in this exemplary embodiment, when a change in the second display information that meets the set condition is detected, a corresponding process is executed. However, even if such a change meets the condition, it does not necessarily imply that the first display information may be changed unconditionally. It may be desirable that an approval be obtained from the content creator or the manager (referred to as "user" hereinafter) before the process for changing the first display information is executed.

If a change that meets the set condition occurs in the second display information, the processing controller 17 causes the approval processor 15 to execute an approval process before a process associated with the condition is executed. In accordance with the command from the processing controller 17, the approval processor 15 transmits a request for an approval for executing the process for changing the first display information to the terminal device used by the user.

When the approval processor 15 receives, from the user, the approval with respect to the aforementioned request, the processing controller 17 executes a corresponding process in accordance with the approval.

The first display information is changed as a result of the processing controller 17 executing the process, and the display details of the first page are changed accordingly. The display controller 14 performs control to cause the terminal device to display a preview of the first page after the change. Accordingly, the user may check the display details of the first page after the change.

Furthermore, the process for changing the first display information is executed in the above-described manner so that when the link relationship with the second display information is canceled, the notifier 16 notifies the manager of the second display information that the second display information is no longer used in the first page. A function for providing a notification to the manager is provided in this manner so that, for example, if a fee has been paid for using the second display information, the collection of the fee may be terminated more reliably.

After the first display information has been changed, the approval processor 15 may transmit, to the terminal device used by the user, a request for an approval for allowing the notifier 16 to provide a notification before the notification is provided to the manager. Then, when the approval processor 15 receives, from the user, the approval with respect to the aforementioned request, the notifier 16 notifies the manager of the second display information that the second display information is no longer used in the first display information in accordance with the approval from the user.

Although the link to the second display information is set in the first display information in this exemplary embodiment, the link, instead of being set, may be replaced with information related to the second display information. This process will be described with reference to FIG. 8.

Figure 8:
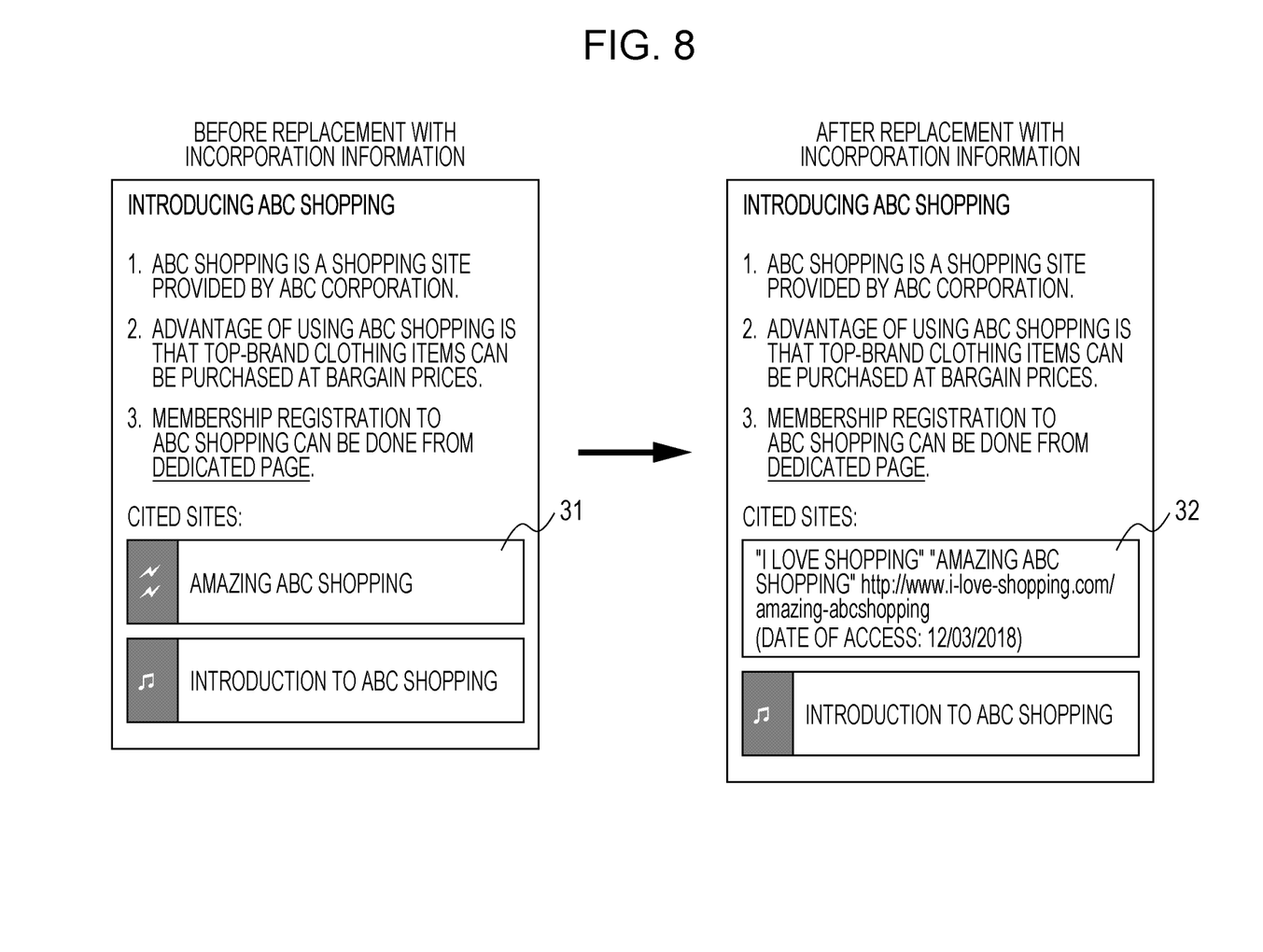
FIG. 8 illustrates an example of pieces of first display information before and after a displayed-information replacing process is executed in accordance with this exemplary embodiment.

FIG. 8 illustrates an example of pieces of first display information before and after an information replacing process to be described below. The first display information shown in FIG. 8 is used as an example of second display information in FIG. 2, but is used as a display example of first display information in FIG. 8.

The link setter 11 refers to information provided by the second display information so as to generate incorporation information to be incorporated into the first display information. The incorporation information includes the name of the second display information, the address information (i.e., the URL), and the time and date of last access to the second display information.

Then, the processing controller 17 replaces a specific link-set section 31 with incorporation information 32. Accordingly, the information related to the second display information serving as a link destination may be presented to the user viewing the source content corresponding to the first display information.

There may be a case where a link to another item of content (e.g., the third display information) is set in the second display information serving as a link destination, as shown in FIG. 2. The link-destination monitoring unit 12 may monitor a change in not only the second display information but also target content (e.g., the third display information) serving as a link destination, and the processing controller 17 may execute the process for changing the first display information in accordance with a change in the second display information and a change in each item of content associated with the second display information (i.e., n-th display information, n being an integer larger than or equal to 3).

As described above, in this exemplary embodiment, a process executable for detecting a change in the second display information and for changing the first display information in correspondence with the detected change is prepared. Accordingly, in addition to providing a simple notification indicating that the link to the second display information is lost, various changes may be made to the first display information.

In the above description, page data described in HTML is described as an example of display information. Moreover, the above description relates to an example where the first display information is page data for encouraging membership registration, and the second display information is page data for presenting information related to membership registration. This is merely an example, and the exemplary embodiment is also applicable to services other than membership registration. For example, the first display information may be sales page data, and the second display information may be a sales service for presenting product-related information.

Furthermore, as an alternative to this exemplary embodiment in which the process for changing the first display information is executed when a specific change occurs in the second display information, the process to be executed may include an additional process. For example, in a case where the exemplary embodiment is applied to a sales service, if a product introduced in the second display information is sold out, for example, the link to the second display information is deleted from the first display information. In this case, information indicating that the product whose information is provided by the second display information is "sold out" may be displayed in the source content. Accordingly, in addition to changing the first display information by deleting the link, a process for adding information (i.e., "sold out" in the above example) indicating the cause or reason that a change has occurred in the second display information may be performed.

Figure 9A:
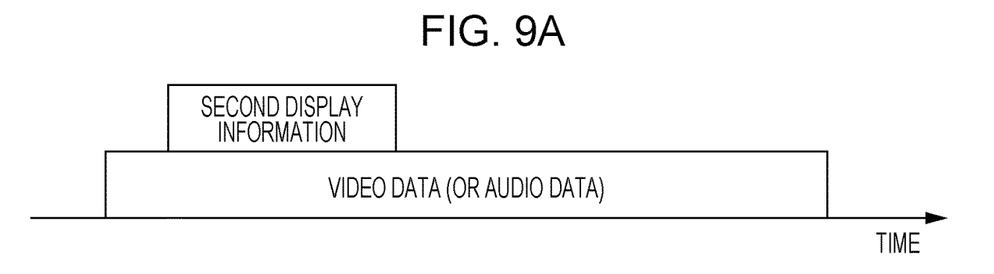
FIGS. 9A to 9C schematically illustrate how a link is set when the first display information is video data or audio data in accordance with this exemplary embodiment.
Figure 9B:
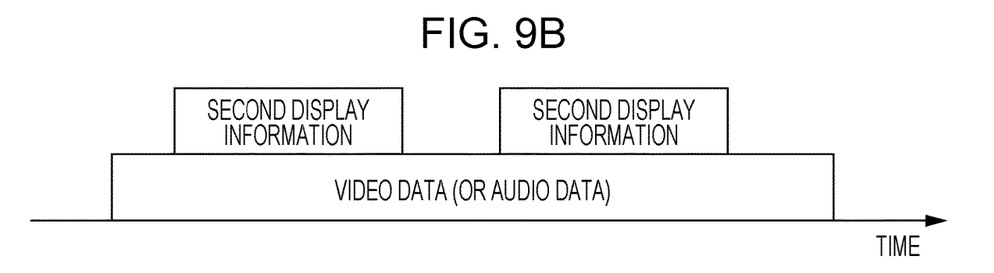
Figure 9C:
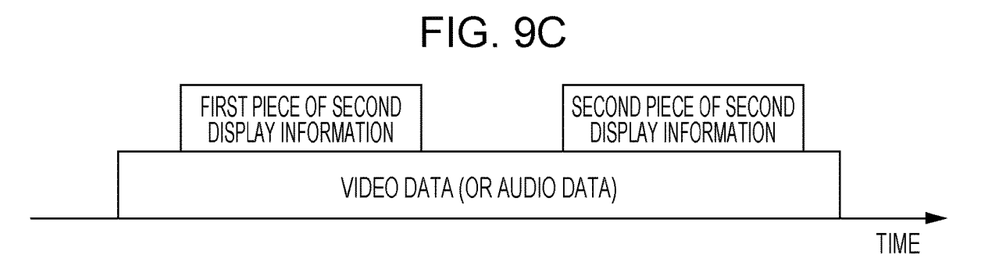

In a case of video data or audio data in which the details of information to be presented may dynamically change over time relative to page data described in the HTML, the link to the second display information may be set only in a specific section (i.e., time) instead of the entire video data or audio data corresponding to the first display information, as shown in FIG. 9A. Furthermore, as shown in FIG. 9B, the aforementioned specific section may include multiple specific sections. Moreover, if multiple specific sections are set, the second display information corresponding to each specific section may vary, as shown in FIG. 9C.

In the exemplary embodiment above, the term "processor" refers to hardware in a broad sense. Examples of the processor include general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
set a link to second display information in a portion of first display information, wherein the first display information is HTML data corresponding to a first page, and the second display information is HTML data corresponding to a second page that can be reached via a link on the first page;
receive an input of a change to the second display information, and correspondingly change the second display information; and
edit the first display information in direct response to change of the second display information.

2. The information processing apparatus according to claim 1,
wherein the edit includes:
making the first display information inaccessible;
deleting the portion with the link and a portion without the link from the first display information; or
deleting only the portion with the link from the first display information.

3. The information processing apparatus according to claim 2,
wherein the processor is configured to receive a designation of a portion to be deleted that includes the portion without the link from the first display information.

4. The information processing apparatus according to claim 3,
wherein the processor is configured to edit the first display information so that a portion subsequent, in a reading direction, to any portion that is deleted from the first display information moves to fill the deleted portion.

5. The information processing apparatus according to claim 2,
wherein the processor is configured to analyze the first display information to determine a portion to be deleted that includes the portion without the link from the first display information.

6. The information processing apparatus according to claim 5,
wherein the processor is configured to edit the first display information so that a portion subsequent, in a reading direction, to any portion that is deleted from the first display information moves to fill the deleted portion.

7. The information processing apparatus according to claim 2,
wherein the processor is configured to edit the first display information so that a portion subsequent, in a reading direction, to any portion that is deleted from the first display information moves to fill the deleted portion.

8. The information processing apparatus according to claim 1,
wherein the edit includes presenting third display information that corresponds to information provided by the second display information or a link to the third display information.

9. The information processing apparatus according to claim 1,
wherein the processor is configured to edit the first display information to include information provided by the second display information.

10. The information processing apparatus according to claim 9,
wherein the change includes at least one of (i) an expiration date relating to the second display information being reached, and (ii) the time remaining to the expiration date reaching a predetermined threshold.

11. The information processing apparatus according to claim 1,
wherein the processor is configured to edit the first display information in response to a prediction that there will be a change to the second display information.

12. The information processing apparatus according to claim 11,
wherein the change includes at least one of (i) an expiration date relating to the second display information being reached, and (ii) the time remaining to the expiration date reaching a predetermined threshold.

13. The information processing apparatus according to claim 1, wherein the editing of the first display information comprises:
transmitting, to a terminal device of a user, a request for an approval for the edit of the first display information;
receiving, from the user, the approval with respect to the request; and
in response to receipt of the approval from the user, editing the first display information.

14. The information processing apparatus according to claim 13, wherein the processor is configured to cause the terminal device to display a preview of the first display information that shows a change to be made to the first display information by the editing.

15. The information processing apparatus according to claim 1, wherein the processor is configured to notify, in response to the first display information being edited, a manager of the second display information that the second display information is no longer used in the first display information.

16. The information processing apparatus according to claim 15, wherein the notifying of the manager comprises:
transmitting, to a terminal device of a user, a request for an approval to notify the manager of the second display information that the second display information is no longer used in the first display information;
receiving, from the user, the approval with respect to the request; and
in response to receipt of the approval, notifying the manager of the second display information that the second display information is no longer used in the first display information.

17. The information processing apparatus according to claim 1, wherein the edit includes making the first display information inaccessible, deleting the portion with the link and a portion without the link from the first display information, or deleting only the portion with the link from the first display information, and a type of the edit changes based upon a type of the condition.

18. The information processing apparatus according to claim 1, wherein the edit also includes raising at least some remaining first display information subsequent to a deletion of other first display information.

19. The information processing apparatus according to claim 1, wherein the change is a change in descriptive details of the second display information by a predetermined number of characters or more.

20. A non-transitory computer readable medium storing a program causing a computer to execute a process for processing information, the process comprising:
setting a link to second display information in a portion of first display information, wherein the first display information is HTML data corresponding to a first page, and the second display information is HTML data corresponding to a second page that can be reached via a link on the first page;
receiving an input of a change to the second display information, and correspondingly changing the second display information; and
editing the first display information in direct response to change of the second display information.

21. An information processing apparatus comprising:
setting means for setting a link to second display information in a portion of first display information, wherein the first display information is HTML data corresponding to a first page, and the second display information is HTML data corresponding to a second page that can be reached via a link on the first page;
receiving means for receiving an input of a change to the second display information;
changing means for correspondingly changing the second display information in response to the received input; and editing means for editing the first display condition in direct response to change of the second display information.

\* \* \* \* \*